US006698320B2

(12) United States Patent
Hu

(10) Patent No.: US 6,698,320 B2
(45) Date of Patent: Mar. 2, 2004

(54) RETAINER RING FOR SECURELY RETAINING A FIRST OBJECT TO A SECOND OBJECT

(76) Inventor: Bobby Hu, 8F, No. 536-1, Ta Chin Street, Taichung (TW)

( * ) Notice: Subject to any disclaimer, the term of this patent is extended or adjusted under 35 U.S.C. 154(b) by 21 days.

(21) Appl. No.: 10/102,658

(22) Filed: Mar. 21, 2002

(65) Prior Publication Data

US 2003/0097914 A1 May 29, 2003

(30) Foreign Application Priority Data

Nov. 28, 2001 (TW) .................................... 90220749 U

(51) Int. Cl.$^{7}$ .............................................. B23B 23/00
(52) U.S. Cl. ...................................................... 81/438
(58) Field of Search ............................ 81/438, 177.85, 81/177.5, 490, 125.1, 439

(56) References Cited

U.S. PATENT DOCUMENTS 2,806,706 A * 9/1957 Fitch .......................... 279/79
4,096,896 A * 6/1978 Engel ....................... 81/121.1
4,787,278 A * 11/1988 Bononi ........................ 81/438
5,042,333 A * 8/1991 Huang ......................... 81/438
5,842,394 A * 12/1998 Hwang ........................ 81/439
5,918,512 A * 7/1999 Habermehl et al. ........... 81/438

* cited by examiner

*Primary Examiner*—Lee D. Wilson
(74) *Attorney, Agent, or Firm*—Alan Kamrath; Rider Bennett, LLP

(57) ABSTRACT

A resilient retainer ring comprises at least two pressing sections and at least one engaging section. Each pressing section presses against a bottom wall defining an annular groove in a receiving compartment of a screwdriver shank when the retainer ring is mounted in the annular groove of the screwdriver shank. The engaging section is exposed to at least one corner of the receiving compartment such that the engaging section has at least a portion engaged in a retaining groove of a bit when an end of the bit is received in the receiving compartment of the screwdriver shank.

20 Claims, 8 Drawing Sheets

RETAINER RING FOR SECURELY RETAINING A FIRST OBJECT TO A SECOND OBJECT

BACKGROUND OF THE INVENTION

1. Field of the Invention

The present invention relates to a retainer ring for securely retaining a first object, e.g., a bit, to a second object, e.g., a shank of a screwdriver.

2. Description of the Related Art

FIG. 6A of the drawings illustrates a conventional retainer ring 1 engaged in an annular groove 3 defined in an inner periphery of a receiving compartment 2 of an object, e.g., a screwdriver shank. After mounting in the annular groove 3, the retainer ring 1 could move to a position shown in FIG. 6B under the action of gravity. This is because there is no means for securely retaining retainer ring 1 in the annular groove 3. As a result, as illustrated in FIG. 7, it would be impossible to mount a bit 4 into the receiving compartment 2, as the retainer ring 1 protrudes too much outward to be inserted into the receiving compartment 2.

SUMMARY OF THE INVENTION

An object of the present invention is to provide a retainer ring for securely retaining a first object, e.g., a bit, to a second object, e.g., a screwdriver shank.

In accordance with the present invention, a combination of a first object, a second object, and a retainer ring is provided. The combination comprises a first object including a retaining groove in an end thereof, a second object including a receiving compartment for removably receiving the end of the first object, and a resilient retainer ring. The receiving compartment has a plurality of corners. An annular groove is defined in an inner periphery defining the receiving compartment. The resilient retainer ring is received in the annular groove of the second object and includes at least two pressing sections and at least one engaging section. Each pressing section presses against a bottom wall defining the annular groove of the second object. The engaging section is exposed to at least one corner of the receiving compartment such that the engaging section has at least a portion engaged in the retaining groove when the end of the first object is received in the receiving compartment.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
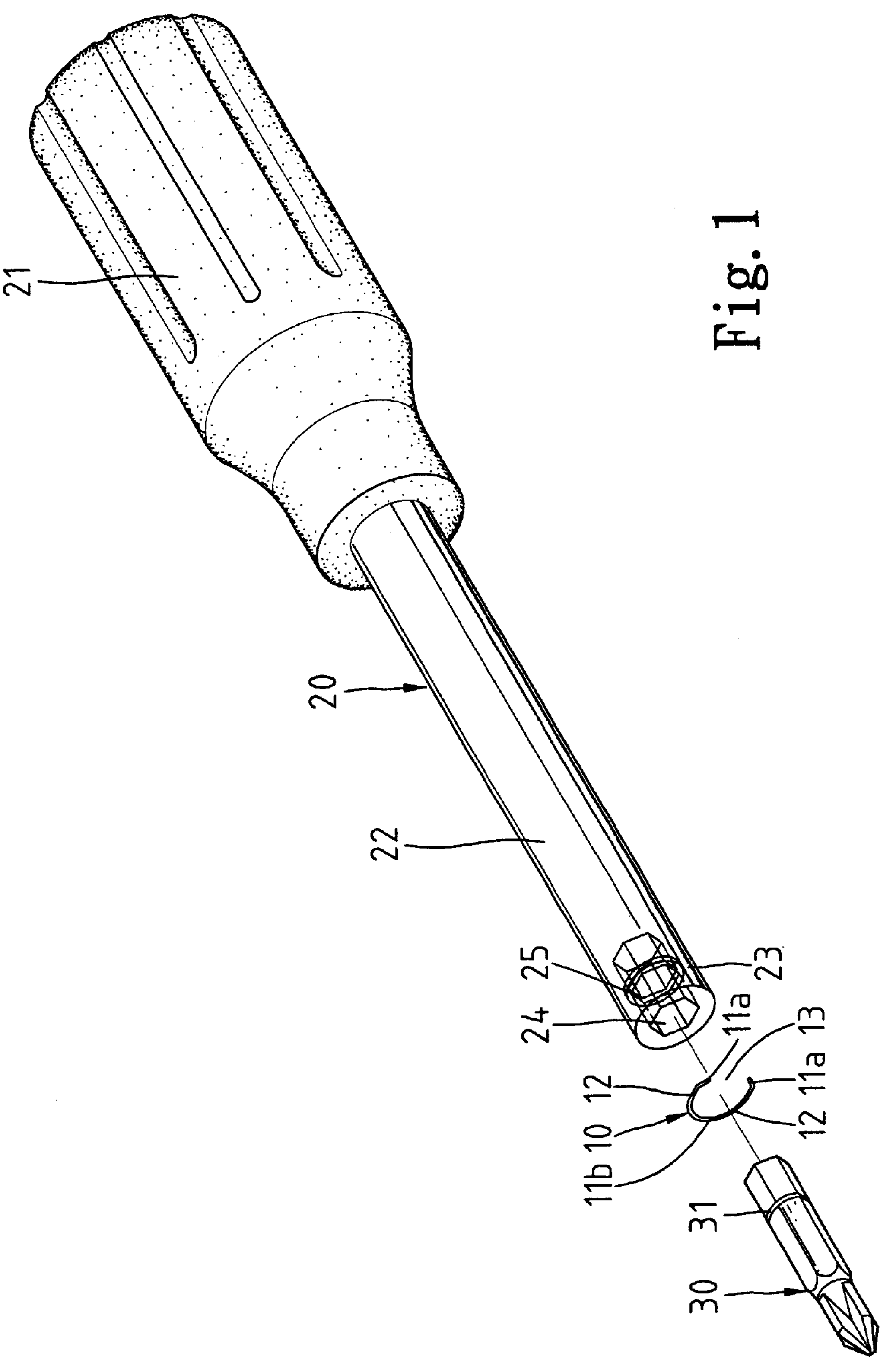
FIG. 1 is an exploded perspective view of a screwdriver, a bit, and a retainer ring in accordance with the present invention.

Referring to FIG. 1, in accordance with the present invention, a retainer ring 10 is provided to securely retain a first object, e.g., a bit 30 to a second object, e.g., a shank 22 of a screwdriver 20. The screwdriver 20 includes a handle 21 attached to an end of the shank 22. A generally hexagonal receiving compartment 24 is defined in the other end 23 of the shank. An annular groove 25 is defined in an inner periphery defining the receiving compartment 24.

Figures 2A, 2B, 2C:
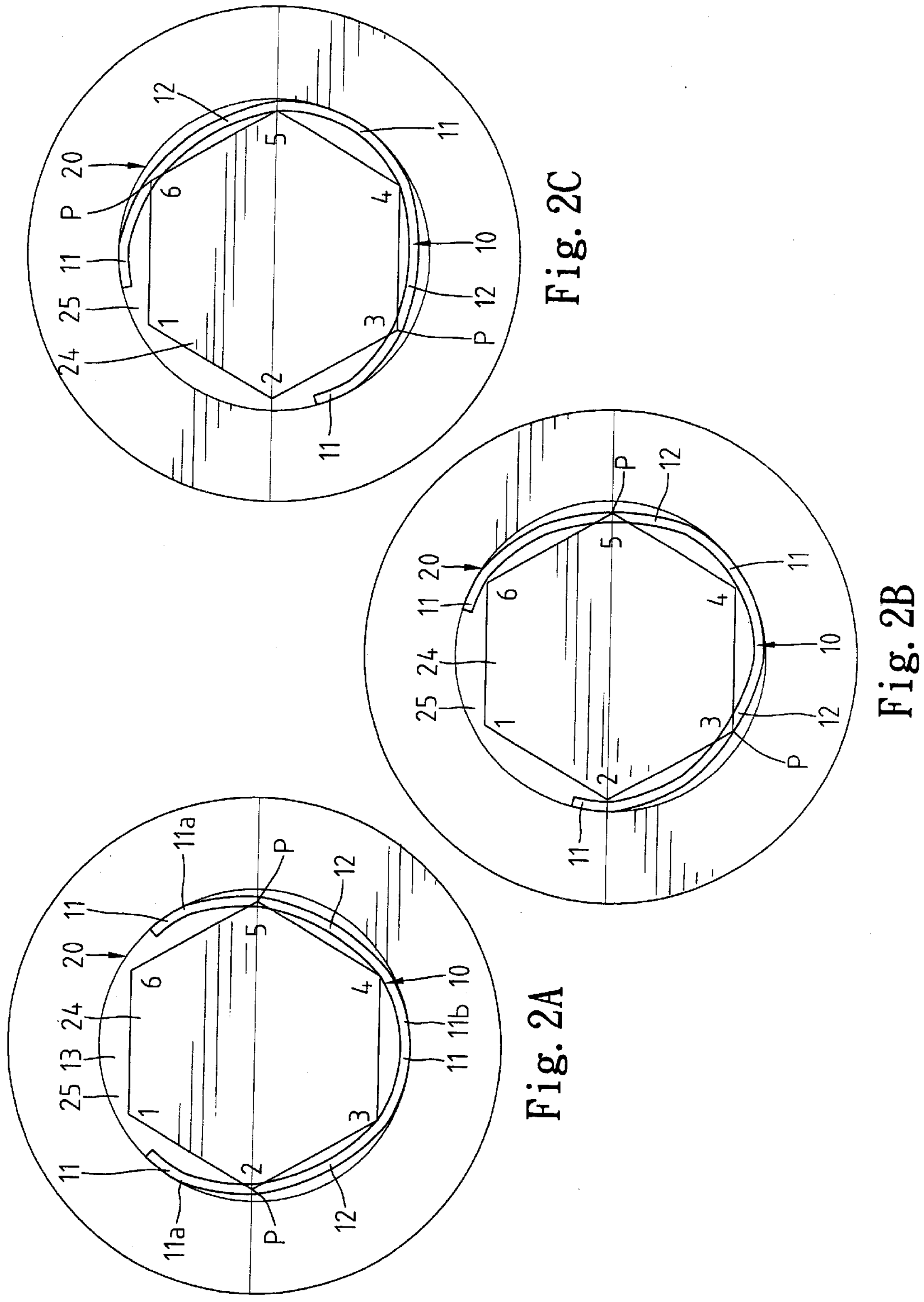
FIG. 2A is a sectional view illustrating engagement of the retainer ring and a shank of the screwdriver.
FIG. 2B is a view similar to FIG. 2A, wherein the retainer ring is rotated 30° in a counterclockwise direction.
FIG. 2C is a view similar to FIG. 2A, wherein the retainer ring is rotated 60° in a counterclockwise direction.

Referring to FIGS. 1 and 2A, the retainer ring 10 is a substantially C-shaped resilient ring having an opening 13 between the distal ends 11*a* thereof. The retainer ring 10 includes at least two radially outward pressing sections 11 that press against a bottom wall defining the annular groove 25 of the shank 22 and at least one radially inward engaging section 12. Namely, the engaging section 12 is located in a position radially inward of the pressing sections 11. In this embodiment, the retainer ring 10 includes three pressing sections 11 located on the distal ends 11*a* of the retainer ring 10 and a section 11*b* of the retainer ring 10 opposite to the opening 13 of the retainer ring 10. It is noted that the opening 13 of the retainer ring 10 is smaller than a half of a circumference of a circle on which the retainer ring 10 locates. Further, the retainer ring 10 includes two engaging sections 12 on both sides of the section 11*b* opposite to the opening 13 of the retainer ring 10.

As illustrated in FIG. 2A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging sections 12 are respectively exposed to the second corner and the fifth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, each engaging section 12 has a portion P engaged in a retaining groove 31 in a hexagonal end of the bit 30. Thus, the bit 30 is securely engaged in the receiving compartment 24 of the screwdriver 20.

Referring to FIG. 2B, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging sections 12 are respectively exposed to the third corner and the fifth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, each engaging section 12 has a portion P engaged in the retaining groove 31 of the bit 30. Thus, the bit 30 is securely engaged in the receiving compartment 24 of the screwdriver 20.

Referring to FIG. 2C, when the retainer ring 10 is engaged in the annular groove 25 in another position, e.g., the retainer ring 10 is further rotated through 30° along the counterclockwise direction, the retainer ring 10 is securely retained in the annular groove 25 of the shank 22, as the pressing sections 11 press against the bottom wall defining the annular groove 25 of the shank 22. Further, the engaging sections 12 are respectively exposed to the third corner and the sixth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, each engaging section 12 has a portion P engaged in the retaining groove 31 of the bit 30. Thus, the bit 30 is securely engaged in the receiving compartment 24 of the screwdriver 20.

Figure 3C:
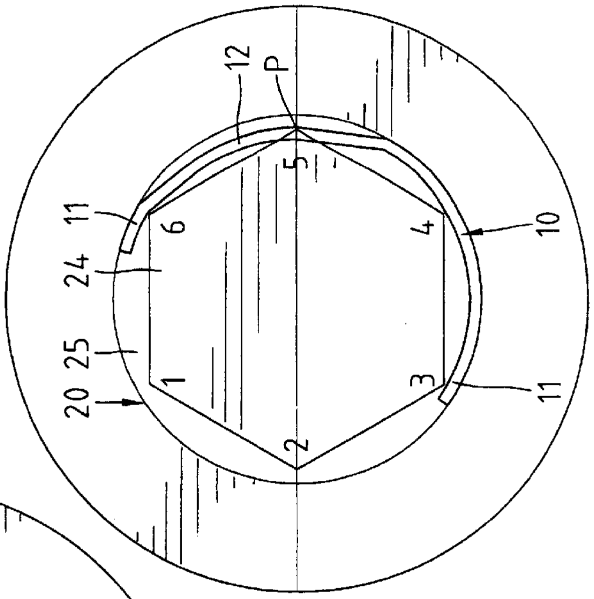
FIG. 3C is a view similar to FIG. 3A, wherein the retainer ring is rotated 60° in a counterclockwise direction.
Figure 3B:
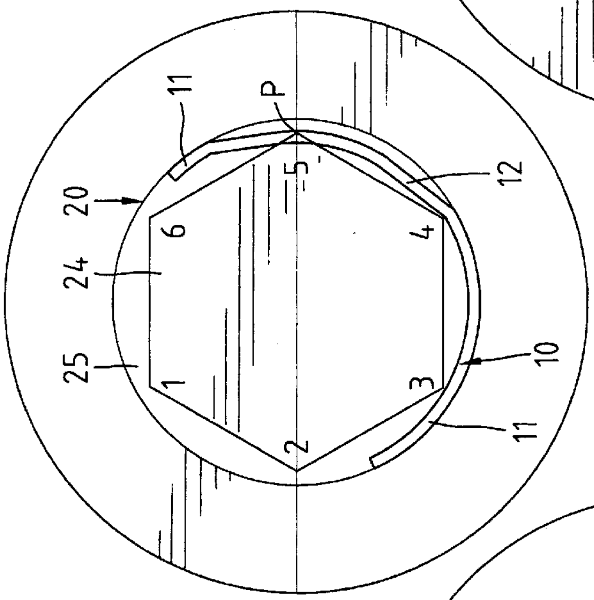
FIG. 3B is a view similar to FIG. 3A, wherein the retainer ring is rotated 30° in a counterclockwise direction.
Figure 3A:
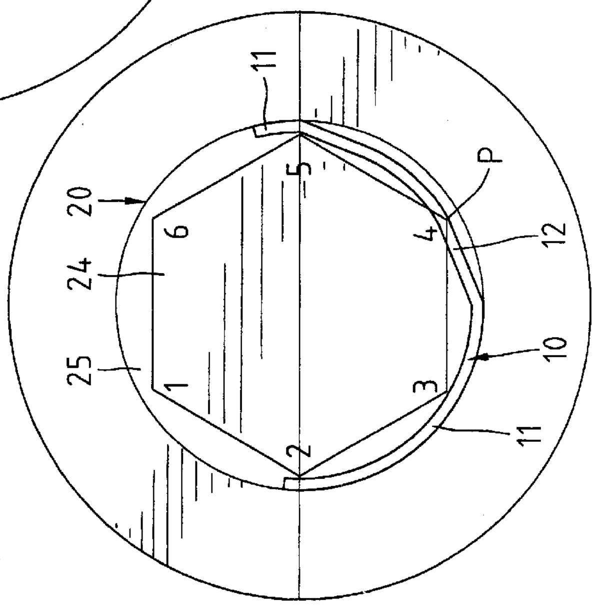
FIG. 3A is a sectional view illustrating engagement of a modified embodiment of the retainer ring and a shank of the screwdriver.

FIG. 3A illustrates a modified embodiment of the retainer ring 10, wherein like numerals denote like elements. In this embodiment, the retainer ring 10 includes two radially outward pressing sections 11 and a radially inward engaging section 12 between the pressing sections 11. One of the pressing sections 11 has a length approximately half of the retainer ring 10, while the other pressing section 11 is much shorter.

As illustrated in FIG. 3A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Referring to FIG. 3D, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Referring to FIG. 3C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the three pressing sections 11 of the retainer ring 10 press against the bottom wall defining the annular groove 25 of the shank 22. Further, the engaging section 12 has a portion P engaged in the retaining groove 31 of the bit 30. Thus, the bit 30 is securely engaged in the receiving compartment 24 of the screwdriver 20.

Figure 4C:
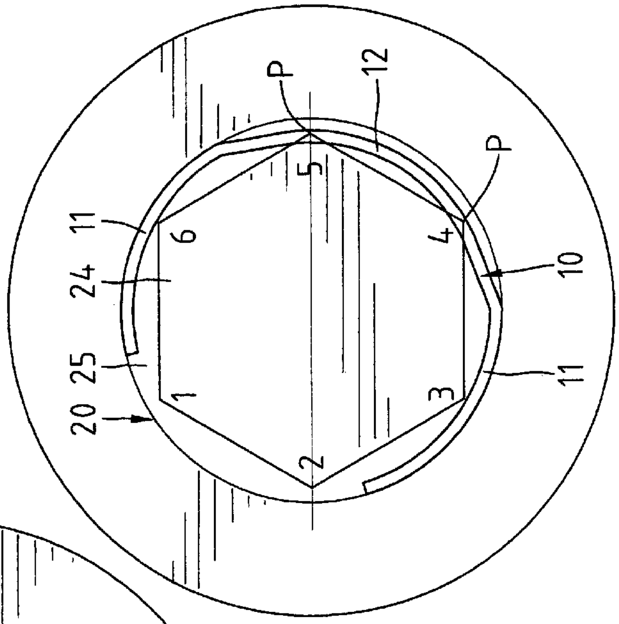
FIG. 4C is a view similar to FIG. 4A, wherein the retainer ring is rotated 60° in a counterclockwise direction.
Figure 4B:
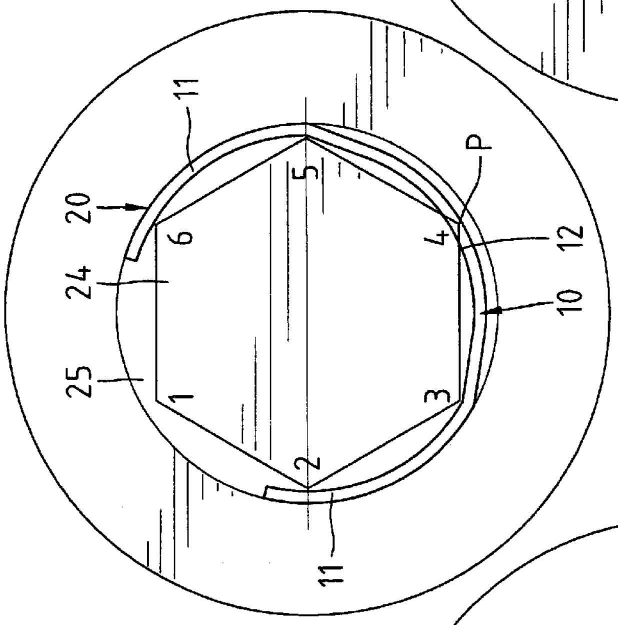
FIG. 4B is a view similar to FIG. 4A, wherein the retainer ring is rotated 30° in a counterclockwise direction.
Figure 4A:
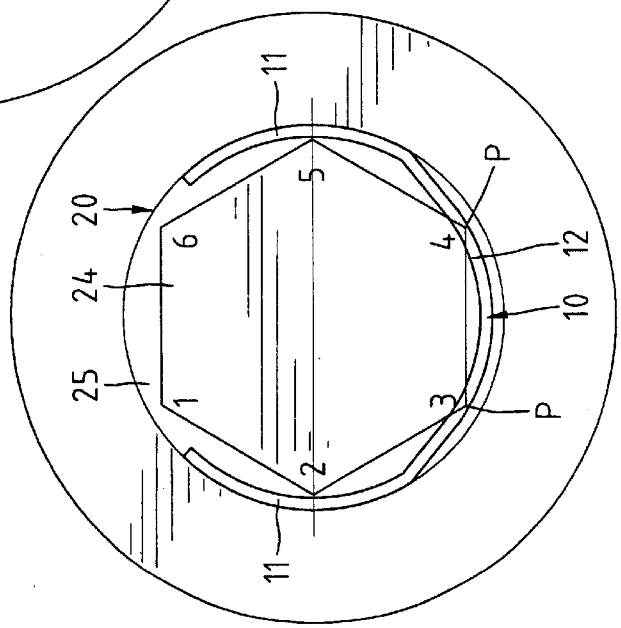
FIG. 4A is a sectional view illustrating engagement of another modified embodiment of the retainer ring and a shank of the screwdriver.

FIG. 4A illustrates another modified embodiment of the retainer ring 10, wherein like numerals denote like elements. In this embodiment, the retainer ring 10 includes a radially inward engaging section 12 opposite to the opening 13 of the retainer ring 10 and two radially outward pressing sections ii on both sides of the engaging section 12. Each radially outward pressing sections 11 includes an associated one of the distal ends (not labeled) of the retainer ring 10.

As illustrated in FIG. 4A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging section 12 is exposed to the third corner and the fourth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has two portions P engaged in the retaining groove 31 of the bit 30. Thus, the bit 30 is securely engaged in the receiving compartment 24 of the screwdriver 20.

Referring to FIG. 4B when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 is engaged in the retaining groove 31 of the bit 30. Thus, the bit 30 is securely engaged in the receiving compartment 24 of the screwdriver 20.

Referring to FIG. 4C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging section 12 is exposed to the fourth corner and the fifth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging section 12 has two portions P engaged in the retaining groove 31 of the bit 30. Thus, the bit 30 is securely engaged in the receiving compartment 24 of the screwdriver 20.

Figure 5C:
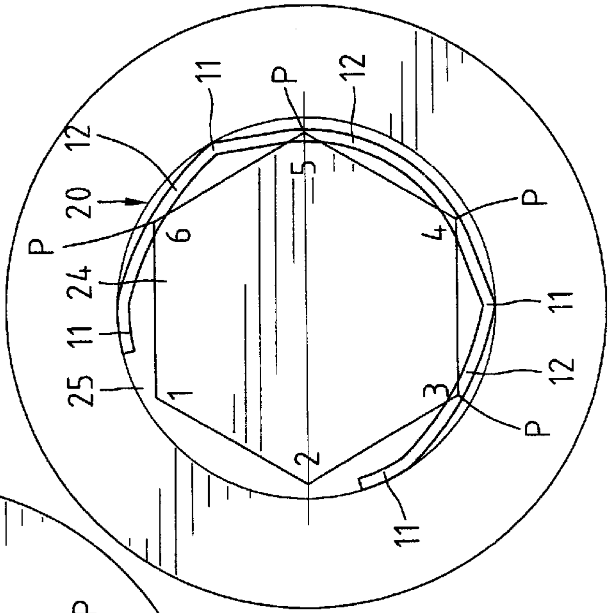
FIG. 5C is a view similar to FIG. 5A, wherein the retainer ring is rotated 60° in a counterclockwise direction.
Figure 5B:
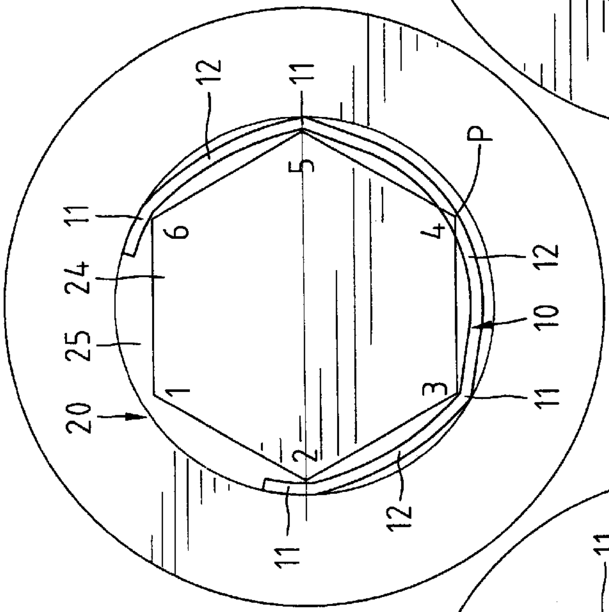
FIG. 5B is a view similar to FIG. 5A, wherein the retainer ring is rotated 30° in a counterclockwise direction.
Figure 5A:
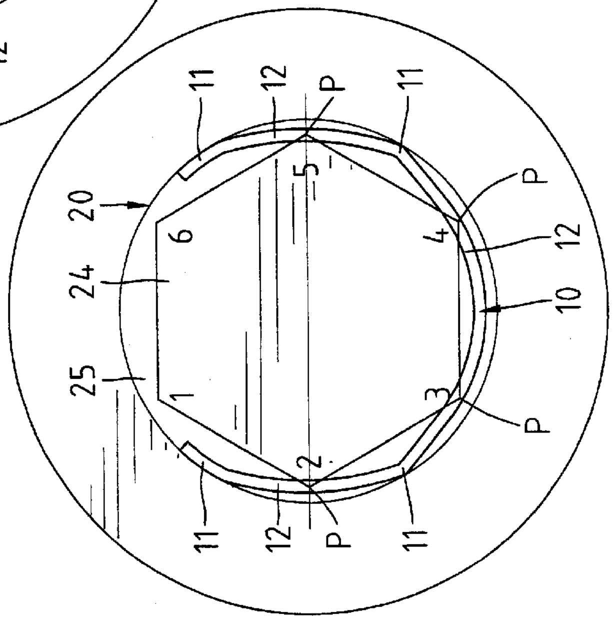
FIG. 5A is a sectional view illustrating engagement of a further modified embodiment of the retainer ring and a shank of the screwdriver.
Figure 6A:
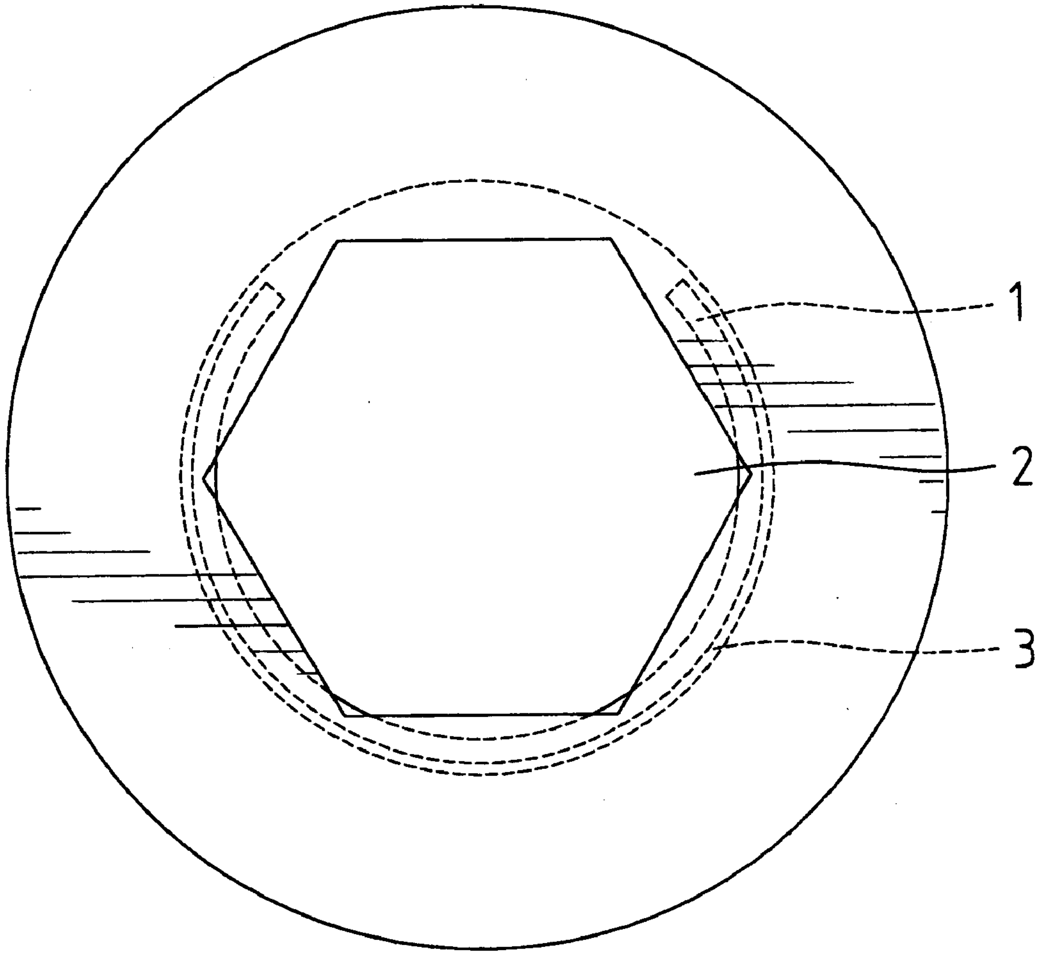
Fig. 6A PRIOR ART
FIG. 6A is a sectional view illustrating engagement between a conventional retainer ring and a screwdriver shank.
Figure 6B:
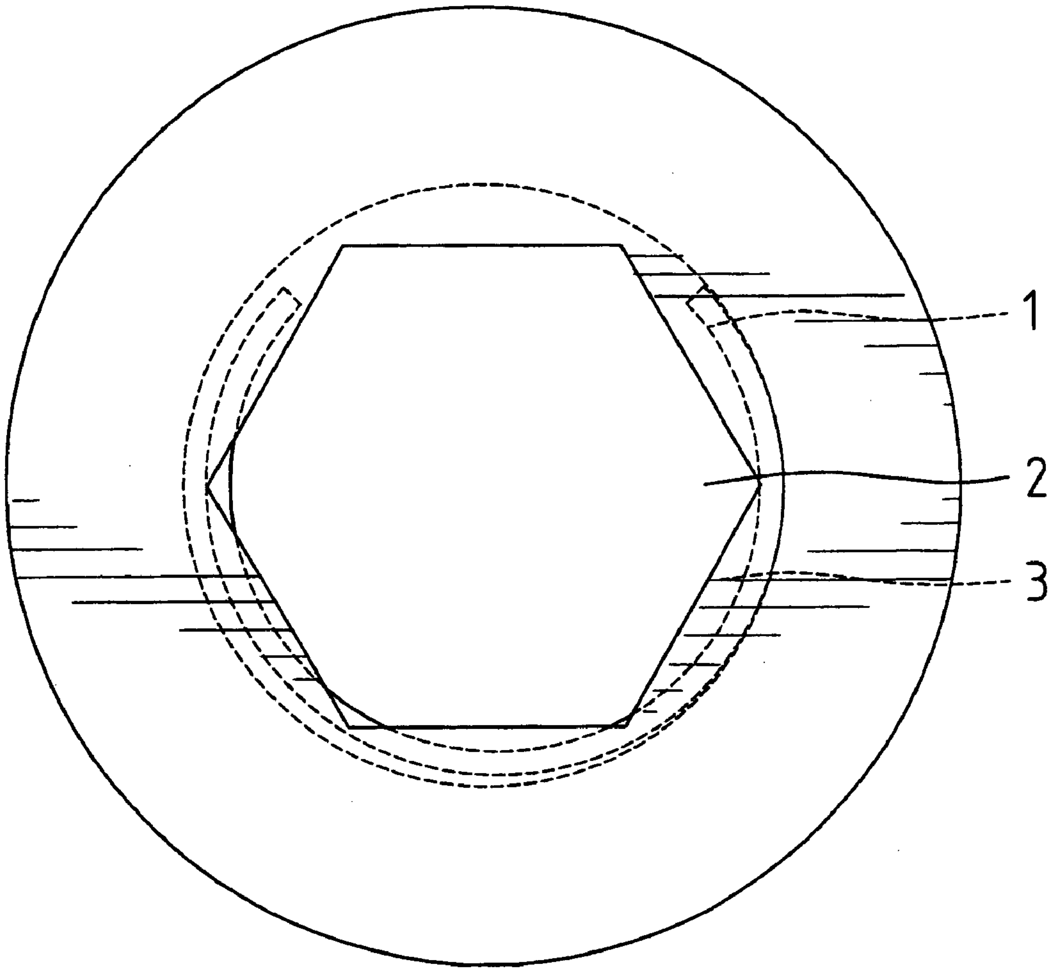
Fig. 6B PRIOR ART
FIG. 6B is a sectional view illustrating anomalous engagement between the retainer ring and the screwdriver shank in FIG. 6A.
Figure 7:
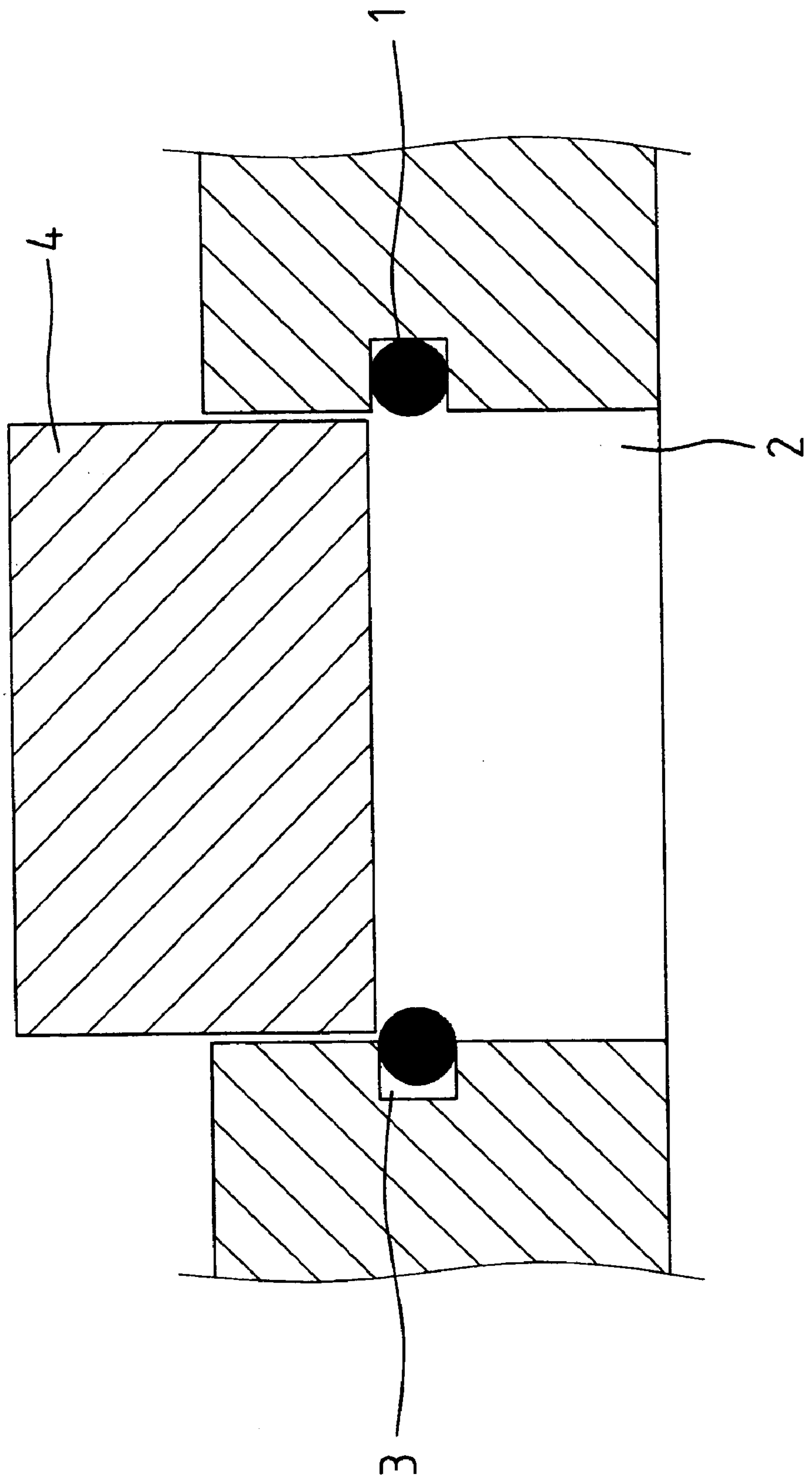
Fig. 7 PRIOR ART
FIG. 7 is a schematic sectional view illustrating difficulty of attaching a bit to the screwdriver shank when the retainer ring is anomalously engaged with the screwdriver shank.

FIG. 5A illustrates a further modified embodiment of the retainer ring 10, wherein like numerals denotes like elements. In this embodiment, the retainer ring 10 includes four radially outward pressing sections 11 and three radially inward engaging sections 12, wherein each engaging section 12 is located between two pressing sections 11.

As illustrated in FIG. 5A, when the retainer ring 10 is mounted into the annular groove 25 of the shank 22 of the screwdriver 20, the retainer ring 10 is securely retained in the annular groove 25 of the shank 22, as the pressing sections 11 press against the bottom wall defining the annular groove 25 of the shank 22. Further, the engaging sections 12 are exposed to the second corner, the third corner, the fourth corner, and the fifth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging sections 12 have portions P engaged in the retaining groove 31 of the bit 30. Thus, the bit 30 is securely engaged in the receiving compartment 24 of the screwdriver 20.

Referring to FIG. 5B, when the retainer ring 10 is engaged in the annular groove 25 in another position, e.g., the retainer ring 10 is rotated 30° in a counterclockwise direction, the retainer ring 10 is securely retained in the annular groove 25 of the shank 22, as the pressing sections 11 press against the bottom wall defining the annular groove 25 of the shank 22. Further, the middle engaging section 12 is exposed to the fourth corner of the receiving compartment 24 of the shank 22 (see the intersection P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the middle engaging section 12 has a portion P engaged in the retaining groove 31 of the bit 30. Thus, the bit 30 is securely engaged in the receiving compartment 24 of the screwdriver 20.

Referring to FIG. 5C, when the retainer ring 10 is engaged in the annular groove 25 in another position, e.g., the retainer ring 10 is further rotated 30° in a counterclockwise direction, the retainer ring 10 is securely retained in the annular groove 25 of the shank 22, as the pressing sections 11 press against the bottom wall defining the annular groove 25 of the shank 22. Further, the engaging sections 12 are exposed to the third corner, the fourth corner, the fifth corner, and the sixth corner of the receiving compartment 24 of the shank 22 (see the intersections P).

Thus, when a bit 30 is inserted into the receiving compartment 24 of the shank 22, the retainer ring 10 would not move or wobble in the annular groove 25 of the shank 22, as the pressing sections 11 of the retainer ring 10 press against the bottom wall defining the annular groove 25 of the shank 22. Further, the engaging sections 12 have portions P engaged in the retaining groove 31 of the bit 30. Thus, the bit 30 is securely engaged in the receiving compartment 24 of the screwdriver 20.

According to the above description, it is noted that the engaging section(s) 12 of the retainer ring 10 includes at least one portion that is securely engaged in the retaining groove 31 of the bit 30 regardless of the angular position of the retainer ring 10 in the annular groove 25 of the shank 22 of the screwdriver 20.

It is noted that the numbers and the shapes of the pressing sections 11 and the engaging sections 12 may vary according to the need.

Although the invention has been explained in relation to its preferred embodiment, it is to be understood that many other possible modifications and variations can be made without departing from the scope of the invention as hereinafter claimed.

What is claimed is:

1. A combination comprising:

a first object including a retaining groove in an end thereof;

a second object including a receiving compartment for removably receiving said end of said first object, said receiving compartment having a plurality of corners, an annular groove being defined in an inner periphery defining said receiving compartment; and a resilient retainer ring received in the annular groove, said retainer ring including at least two pressing sections and at least one engaging section, with said at least two pressing sections separated by said at least one engaging section, wherein both of said at least two pressing sections simultaneously press against a bottom wall defining said annular groove of said second object and are located outside of the retaining groove, with said at least two pressing sections holding said at least one engaging section away from the bottom wall defining said annular groove, wherein said at least one engaging section is exposed to at least one of said corners of said receiving compartment by being held by said at least two pressing sections simultaneously pressing against the annular groove such that said at least one engaging section has at least a portion engaged in said retaining groove when said end of said first object is received in said receiving compartment.

2. The combination as claimed in claim 1, wherein said retainer ring includes two distal ends spaced by an opening, each of said distal ends of said retainer forming an associated one of said at least two pressing sections.

3. The combination as claimed in claim 2, wherein one of said at least two pressing sections is opposite to said opening.

4. The combination as claimed in claim 3, wherein said first object is a bit and said second object is a shank of a screwdriver.

5. The combination as claimed in claim 4, wherein said receiving compartment is hexagonal and said end of said first object is hexagonal.

6. The combination as claimed in claim 3, wherein said receiving compartment is hexagonal and said end of said first object is hexagonal.

7. The combination as claimed in claim 2, wherein said first object is a bit and said second object is a shank of a screwdriver.

8. The combination as claimed in claim 7, wherein said receiving compartment is hexagonal and said end of said first object is hexagonal.

9. The combination as claimed in claim 2, wherein said receiving compartment is hexagonal and said end of said first object is hexagonal.

10. The combination as claimed in claim 1, wherein said retainer ring includes an opening and wherein one of said at least one engaging section of said retainer ring is opposite to said opening.

11. The combination as claimed in claim 10, wherein said first object is a bit and said second object is a shank of a screwdriver.

12. The combination as claimed in claim 11, wherein said receiving compartment is hexagonal and said end of said first object is hexagonal.

13. The combination as claimed in claim 10, wherein said receiving compartment is hexagonal and said end of said first object is hexagonal.

14. The combination as claimed in claim 1, wherein one of said at least two pressing sections is longer than another of said at least two pressing sections.

15. The combination as claimed in claim 14, wherein said first object is a bit and said second object is a shank of a screwdriver.

16. The combination as claimed in claim 14, wherein said receiving compartment is hexagonal and said end of said first object is hexagonal.

17. The combination as claimed in claim 1, wherein said retainer ring includes a plurality of alternately disposed pressing sections and engaging sections.

18. The combination as claimed in claim 1, wherein said first object is a bit and said second object is a shank of a screwdriver.

19. The combination as claimed in claim 1, wherein said receiving compartment is hexagonal and said end of said first object is hexagonal.

20. The combination as claimed in claim 19, wherein said first object is a bit and said second object is a shank of a screwdriver.

* * * * *